(12) United States Patent
Tøndel (10) Patent No.: US 11,927,065 B2
(45) Date of Patent: Mar. 12, 2024

(54) WELL TOOL DEVICE FOR FORMING A PERMANENT BARRIER IN A WELL (71) Applicant: INTERWELL P&A AS, Hafrsfjord (NO)

(72) Inventor: Stian Tøndel, Trondheim (NO)

(73) Assignee: INTERWELL P&A AS, Hafrsfjord (NO)

( * ) Notice: Subject to any disclaimer, the term of this patent is extended or adjusted under 35 U.S.C. 154(b) by 99 days.

(21) Appl. No.: 17/763,147

(22) PCT Filed: Sep. 21, 2020

(86) PCT No.: PCT/EP2020/076250
§ 371 (c)(1),
(2) Date: Mar. 23, 2022

(87) PCT Pub. No.: WO2021/058422
PCT Pub. Date: Apr. 1, 2021

(65) Prior Publication Data
US 2022/0412181 A1 Dec. 29, 2022

(30) Foreign Application Priority Data
Sep. 23, 2019 (NO) .................................. 20191143

(51) Int. Cl.
E21B 29/02 (2006.01)
E21B 33/12 (2006.01)
(Continued)

(52) U.S. Cl.
CPC .......... *E21B 29/02* (2013.01); *E21B 33/1204* (2013.01); *E21B 33/13* (2013.01); *F42D 1/18* (2013.01)

(58) Field of Classification Search
CPC ...... E21B 29/02; E21B 33/1204; E21B 33/13; E21B 33/1208; F42D 1/18; Y02E 10/10
See application file for complete search history.

(56) References Cited

U.S. PATENT DOCUMENTS 5,698,812 A * 12/1997 Song ........................ F42B 12/44
102/364
11,299,949 B2 * 4/2022 Cardno .................. E21B 36/006
(Continued)

FOREIGN PATENT DOCUMENTS

GB 2559217 A 8/2018
WO 2013/135583 A2 9/2013

OTHER PUBLICATIONS

International Search Report issued in PCT/EP2020/076250 dated Nov. 13, 2020 (5 pages).
(Continued)

Primary Examiner — Steven A MacDonald
(74) Attorney, Agent, or Firm — Osha Bergman Watanabe & Burton LLP (57) ABSTRACT A well tool device for forming a permanent barrier in a well includes a housing and an ignition device. A compartment is provided in the housing. A pyrotechnic mixture or heat generating mixture is provided within the compartment. The ignition device is adapted to heating at least a part of the pyrotechnic mixture or the heat generating mixture to its ignition temperature. If the pyrotechnic mixture is provided, the pyrotechnic mixture includes a first metal and at least a section of the housing is made of the first metal. If the heat generating mixture is provided, at least a section of the housing is made from a material being a constituent of the heat generating mixture.

18 Claims, 9 Drawing Sheets (51) Int. Cl.
*E21B 33/13* (2006.01)
*F42D 1/18* (2006.01)

(56) References Cited

U.S. PATENT DOCUMENTS

| | | | |
|---|---|---|---|
| 2003/0145924 A1 | 8/2003 | Carter | |
| 2006/0037748 A1* | 2/2006 | Wardlaw | E21B 36/008 |
| | | | 166/387 |
| 2009/0308620 A1 | 12/2009 | Tilghman | |
| 2015/0034317 A1 | 2/2015 | Skjold | |
| 2015/0211328 A1* | 7/2015 | Lowry | C09K 8/00 |
| | | | 166/135 |
| 2018/0371859 A1* | 12/2018 | Tøndel | E21B 36/008 |
| 2019/0032440 A1* | 1/2019 | Tøndel | E21B 33/1204 |
| 2019/0085659 A1* | 3/2019 | Carragher | E21B 33/124 |
| 2021/0324697 A1* | 10/2021 | Cardno | E21B 43/243 |
| 2022/0195833 A1* | 6/2022 | Eldevik | E21B 33/13 |

OTHER PUBLICATIONS

Written Opinion of the International Searching Authority issued in PCT/EP2020/076250 dated Nov. 13, 2020 (9 pages).
Norwegian Search Report issued in No. 20191143 dated Mar. 24, 2020 (2 pages).

* cited by examiner

WELL TOOL DEVICE FOR FORMING A PERMANENT BARRIER IN A WELL

FIELD OF THE INVENTION

The present invention relates to a well tool device for forming a permanent barrier in a well.

BACKGROUND OF THE INVENTION

Plugging and abandonment operations, often referred to as P&A operations, are performed to permanently close oil and/or gas wells. Typically, this is performed by providing a permanent well barrier above the oil and/or gas producing rock types, typically in the cap rock in which the well has been drilled through.

There are several technical and regulatory requirements for such permanent well barriers, some of which are a) impermeability of oil and/or gas through the permanent well barrier, b) long term integrity, c) non shrinking of the permanent well barrier, d) ductility (non brittle)—the permanent well barrier must be able to withstand mechanical loads or impact, e) resistance to different chemicals/substances ($H_2S$, $CO_2$ and hydrocarbons) and f) wetting—to ensure bonding to steel.

In WO2013/135583 (Interwell P&A AS), it is disclosed method for performing a P&A operation wherein a first step, it was provided an amount of a heat generating mixture (for example thermite) at a desired location in the well and thereafter to ignite the heat generating mixture to start a heat generation process. It is also disclosed a tool for transporting the heat generating mixture into the well before ignition. Such a heat generating mixture may also be referred to as a pyrotechnic mixture.

Figure 1A:
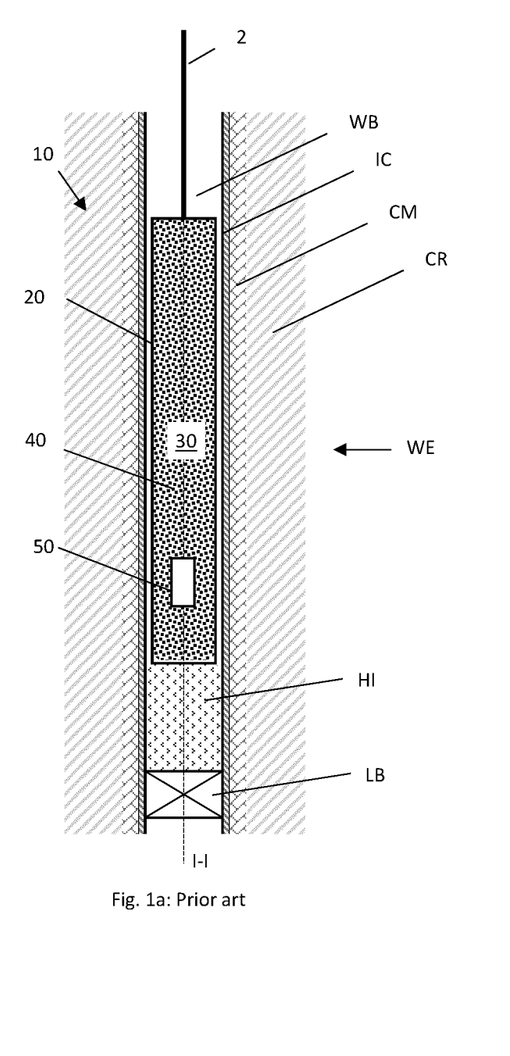
FIG. 1a illustrates a cross sectional side view of a well tool in which heat generating mixture is provided, the well tool being lowered into a well.

In short, the above prior art will be described with reference to FIGS. 1a and 1b. In FIG. 1, a well WE is shown to be provided through a section of a cap rock CR. The inner surface of a well bore WB is provided by an inner casing IC, where cement CM is provided in the annulus between the inner casing IC and the cap rock CR. It should be noted that some wells have several casings provided radially outside of each other, where cement or fluids are provided in the respective annuli. In FIG. 1a, it is shown that a lower barrier LB has been provided in the well bore WB. Above the lower barrier LB a heat insulating material HI, such as sand, has been provided. A well tool 10 has been lowered into the well above the heat insulating material HI by means of a wireline 2. The well tool 10 comprises a housing 20 with a compartment 30 which contains a heat generating mixture 40 (for example thermite). An ignition device 50 is also provided in the compartment 30. The ignition device 50 starts the heat generating process of the heat generating mixture 40. The ignition device 50 may be time actuated or pressure actuated. Alternatively, the ignition device 50 may be actuated by means of a topside signal transferred via wire to the ignition device.

Figure 1B:
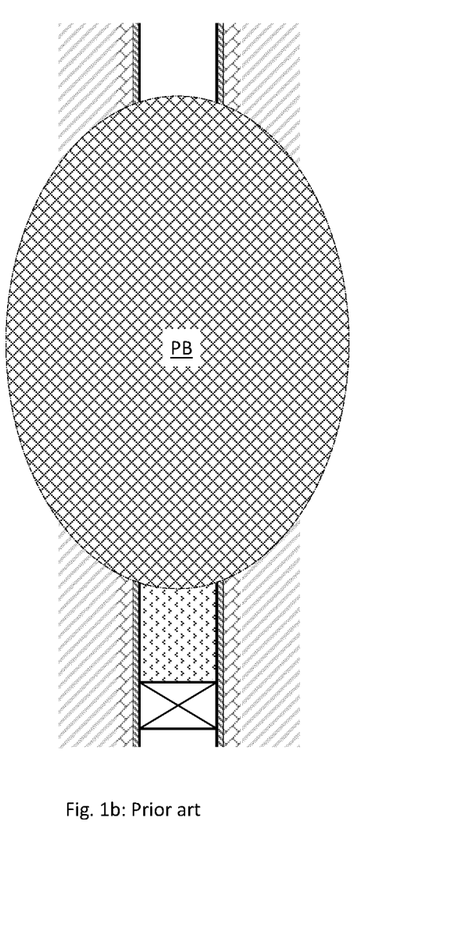
FIG. 1b illustrates a cross sectional side view of the well after the heat generating process, where a permanent well barrier has been formed.

The result after the ignition is shown in FIG. 1b. Here it is shown that the elements of the well, i.e. inner casing IC, cement CE and cap rock CR have melted and thereafter hardened into one solid permanent well barrier PB containing constituents of rock, cement, steel and other elements being present in the well. Such other elements are the end product of the heat generation process, remains of the tool used to transport the heat generating mixture into the well, the ignition system etc.

During the last years, this technology has tested in test centers and in field trials, in order to verify that the permanent well barrier fulfills technical and regulatory requirements.

In some tests it was discovered that the permanent well barrier had thin layers or zones in which the bonding between the materials forming the permanent well barrier was weaker than other parts of the permanent well barrier. One object of the present invention is to provide a more homogenous permanent well barrier.

Another object of the invention is to improve the heat generation process used to creating the permanent well barrier.

Yet another purpose is to reduce the weight of the well tool used to transport the heat ignition material.

SUMMARY OF THE INVENTION

The present invention relates to a well tool device for forming a permanent barrier in a well, comprising:
 a housing in which a compartment is provided;
 a pyrotechnic mixture provided within the compartment;
 an ignition device adapted to heating at least a part of the pyrotechnic mixture to its ignition temperature;
 the pyrotechnic mixture comprises a first metal;
characterized in that
 at least a section of the housing is made of the first metal.

The pyrotechnic mixture may also be referred to as a heat generating mixture as the main purpose of the pyrotechnic mixture is to generate heat.

In one aspect, the pyrotechnic mixture comprises a particulate of the first metal.

In one aspect, the pyrotechnic mixture comprises a particulate metal oxide of a second metal.

In one aspect, the second metal in an over-stoichiometric amount relative to a red-ox reaction; where the first metal is oxidized to a metal oxide and the second metal is reduced to elementary metal.

Preferably, the first metal is a different metal than the second metal.

In prior art, the housing is made from steel. According to the present disclosure, the amount of steel in the solid permanent barrier resulting from the heat generation process is reduced. Hence, the solid permanent barrier will be more homogenous, thereby avoiding or at least reducing weaker layers or zones in the permanent well barrier.

In one aspect, the first metal is more reactive than the second metal as defined in a reactivity series of metals.

The present invention also relates to a well tool device according any one of the above claims, wherein the first metal is one of the following metals Mg, Al, Ti, Mn, V, Zn, Cr, Mo, Co, Ni, Sn, Pb, Cu, or B.

In a preferred embodiment, the first metal is aluminum or an aluminum alloy. In yet a preferred embodiment, the first metal is magnesium or a magnesium alloy.

In one aspect, the metal oxide of the second metal is one of: copper(II) oxide, chromium(III) oxide, iron(II, III) oxide, manganese(IV) oxide, silicon dioxide, boron trioxide, or lead(II, IV) oxide.

In one aspect, the housing comprises a lower housing section, an intermediate housing section and an upper housing section, where the section of the housing made of the first metal is the intermediate section.

In one aspect, the lower housing section comprises a heat insulation material.

According to the above aspect, it is at least partially prevented that molten material, i.e. melted heat generating mixture and other materials melted by the heat generation process flow to an undesired location during the heat generation process.

In one aspect, the height of the section of the housing made of the first metal may be 70-90% of the total height of the housing. In one aspect, the height may be equal to a height of the intermediate section.

In one aspect, the housing is cylindrical.

In one aspect, the section comprises an inner wall structure separating the compartment into sub-compartments.

In one aspect, at least one of the sub-compartments has a cross sectional shape of a circular sector or a circular segment.

In one aspect, at least one of the sub-compartments has a cross sectional shape of a hexagon.

Alternatively, the at least one sub-compartment may have a cross sectional shape of other polygons, such as a pentagon, octagon, heptagon etc.

In one aspect, at least one of the sub-compartments has a cross sectional shape of a circle.

The inner wall structure may reinforce the housing and/or the housing section.

In one aspect, a first type of particulate of the second metal is used in one or some of the sub-compartments, while a second type of particulate of the second metal is used in other sub-compartments.

In one aspect, a first type of particulate of the first metal is used in one or some of the sub-compartments, while a second type of particulate of the second metal is used in other sub-compartments.

In one aspect, the surface of the inner wall structure is coated.

In one aspect, the inner wall structure is provided in a longitudinal direction, thereby separating the compartment into longitudinal sub-compartments.

In one aspect, the section of the housing made of the first metal is shaped by means of an extruding process.

In one aspect, the ignition device is provided within the compartment. In embodiments with two or more sub-compartments, the ignition device may be provided in one of the sub-compartments. There may be several ignition devices provided in different sub-compartments. There may be one ignition device provided in each compartment. It is also possible that the ignition device is provided outside of the compartment. For example, the ignition device may be provided in a separate housing below the housing or above the housing, where the heat produced by the ignition device ignites the pyrotechnic mixture. The ignition device can also be provided as several ignition devices axially distributed throughout the entire length of the tool. The ignition device may be controlled based on a predetermined time, a predetermined pressure, or a combination of a predetermined time and pressure. The ignition device may also be remotely controlled, for example from topside based on a control signal.

The present invention also relates to a well tool device for forming a permanent barrier in a well, comprising:
a housing in which a compartment is provided;
a pyrotechnic mixture provided within the compartment;
an ignition device adapted to heating at least a part of the pyrotechnic mixture to its ignition temperature;
characterized in that:
at least a section of the housing is made from a material being a constituent of the pyrotechnic mixture.

In one aspect, the section of the housing is consumed during a pyrotechnic process started by heating at least a part of the pyrotechnic mixture to its ignition temperature.

As used herein, the term "pyrotechnic mixture" is a particulate mixture of a first metal and an oxide of a second metal, which when heated to an ignition temperature will react spontaneously in an exothermic and self-sustained chemical reaction where the first metal is oxidized to a metal oxide and the second metal is reduced to elementary metal, such as e.g. the reaction between particulate ferric oxide and particulate aluminum:

$Fe_2O_3 + 2Al \rightarrow 2Fe + Al_2O_3 + heat$

Other examples are presented in the detailed description below.

As used herein, the term "in an over-stochiometric amount" means that the metal oxide of the second metal is present in excess such that when the exothermic and self-sustained red-ox reaction has oxidized all of the particulate first metal of the pyrotechnic mixture to an oxide, there is still left an amount of the oxide of the second metal which will react with and consume metal of the wall of the housing since the wall is made of the first metal.

As used herein, the term "the first metal is more reactive than the second metal" means that the first metal of the pyrotechnic mixture has a higher reactivity than the second metal of the metal oxide. The reactivity of metals is determined empirically and given in reactivity series well known to the person skilled in the art. An example of a reactivity series of metals is found in e.g. Wikipedia: https://en.wikipedia.org/wiki/Reactivity_series.

The terms "upper", "above", "below" and "lower" are used herein to define positions in a well. "Upper" and "above" refer to a position relatively closer to the well opening and "below" and "lower" refer to a position relatively further away from the well opening. These terms apply both when the well has a vertical and horizontal orientation.

DETAILED DESCRIPTION

In the following, embodiments of the present invention will be described in detail with reference to the enclosed drawings, where:

FIGS. 2 and 3 illustrates a first embodiment, where

FIRST EMBODIMENT

Figure 2:
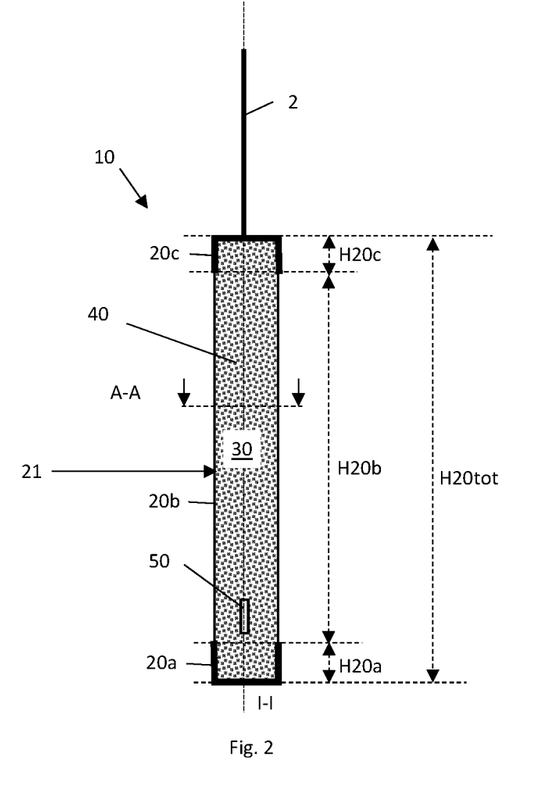
FIG. 2 illustrates a cross sectional side view along line B-B of FIG. 3.
Figure 3:
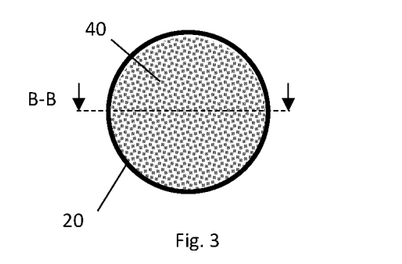
FIG. 3 illustrates a cross sectional top view along line A-A in FIG. 2.

It is now referred to FIGS. 2 and 3, where a well tool device 10 is shown. Similar to prior art, the well tool device 10 comprises a housing 20 in which a compartment 30 is provided, where a pyrotechnic mixture 40 is provided within the compartment 30. The pyrotechnic mixture 40 is here shown as grey dots, illustrating the particles forming the pyrotechnic mixture 40. The pyrotechnic mixture 40 is omitted from FIG. 3 for clarity.

The housing 20 is cylindrical and has a longitudinal center axis illustrated as a dashed line I-I. The total height of the housing 20 is illustrated as height H20tot.

The housing 20 comprises a lower housing section 20a, an intermediate housing section 20b and an upper housing section 20c. The upper housing section 20c is connected to a wireline 2. The lower housing section 20a has a height H20a, the intermediate section H20b has a height H20b and the upper housing section 20c has a height H20c, where the total height H20tot equals the sum of H20a, H20b and H20c. The height H20b may be 70-90% of the height H20tot. As an example, H20tot may be 4 meters, and H20b may be 3.2 meters.

It should be noted that the upper and lower housing sections 20a, 20b in FIG. 2 are drawn with thicker lines than the intermediate housing section 20b. This is done for illustration purposes only and is not representative of the material thickness of these housing sections.

The housing sections 20a, 20b, 20c may be connected to each other by means of threaded connections, by means of fasteners such as screws etc, or by other means.

In the present embodiment, the lower housing section 20a comprises a heat insulation material, to at least partially prevent or delay that molten material flow to an undesired location during the heat generation process. The insulation material may for example comprise carbon, graphite or a ceramic material.

The well tool device 10 further comprises an ignition device 50 adapted to heat at least a part of the pyrotechnic mixture 40 to its ignition temperature. Hence, when the pyrotechnic mixture is ignited, a pyrotechnic heat generating process starts, resulting in that casing and other parts outside of casing (cement, formation (i.e. cap rock) etc.) will start to melt. When the pyrotechnic heat generation process ends, a permanent barrier will have formed.

In FIG. 2, reference number 21 refers to a section of the housing 20. In FIG. 2, the section 21 of the housing 20 corresponds to the intermediate section 20b of the housing 20.

The section 21 of the housing 20 is made from a material being a constituent of the pyrotechnic mixture 40. Hence, during the heat generation process, the material of the section 21 will be consumed. In FIG. 2, the lower and upper housing sections 20a, 20c will be made of a steel material, similar to the steel material used for the entire housing 20 in prior art. Hence, the total amount of steel material is reduced. It is assumed that this contributes to a more homogenous permanent well barrier after the heat generation process.

The pyrotechnic mixture 40 and the pyrotechnic process will be described in detail below.

The Pyrotechnic Process

The pyrotechnic mixture 40 comprises a particulate of the first metal and a particulate metal oxide of a second metal in an over-stoichiometric amount relative to a red-ox reaction.

The first metal is oxidized to a metal oxide and the second metal is reduced to elementary metal where the first metal is a different metal than the second metal. Heat is a result of this reaction.

One example of such a pyrotechnic mixture is the following:

$$Fe_2O_3 + 2Al \rightarrow 2Fe + Al_2O_3 + heat \quad (1)$$

Here, the first metal is aluminum (Al) and the second metal is iron oxide (Fe2O3). The first metal is oxidized to the metal oxide aluminum oxide (Al2O3) and the second metal is reduced to the elementary metal iron (Fe). Heat is produced during this process, which often is referred to as a thermite process.

In the above example, the first metal is more reactive than the second metal as defined in a reactivity series of metals.

In alternative embodiments for such a reaction, the first metal may be of the following metals Mg, Al, Ti, Mn, V, Zn, Cr, Mo, Co, Ni, Sn, Pb, Cu, or B and the metal oxide of the second metal is one of: copperII oxide, chromiumIII oxide, ironII, III oxide, manganeseIV oxide, silicon dioxide, boron trioxide, or leadII, IV oxide. When combining the above, the first metal is more reactive than the second metal as defined in a reactivity series of metals.

Some examples of alternative processes, in which the first metal is aluminum, are disclosed below:

$$Fe_2O_3 + 2Al \rightarrow 2Fe + Al_2O_3 + heat \quad (2)$$

$$3Fe_3O_4 + 8Al \rightarrow 9Fe + 4Al_2O_3 + heat \quad (3)$$

$$3MnO_2 + 4Al \rightarrow 3Mn + 2Al_2O_3 + heat \quad (4)$$

$$Mn_2O_3 + 2Al \rightarrow Mn + Al_2O_3 + heat \quad (5)$$

$$3SiO_2 + 4Al \rightarrow 3Si + 2Al_2O_3 + heat \quad (6)$$

It should be noted that the heat produced in the above processes will vary from process to process. In addition, the speed of the reaction will vary from process to process.

As mentioned above, it is also possible to use magnesium as the first metal, as disclosed below:

$$Fe_2O_3 + 3Mg \rightarrow 2Fe + 3MgO + heat \quad (7)$$

As described above, at least a section 21 of the housing 20 is made of the first metal. Hence, the section 21 may be made of aluminum or an aluminum alloy, where the pyrotechnic reaction is one of reactions (1)-(6) above.

In a preferred embodiment, the first metal is aluminum or an aluminum alloy. Suitable aluminum alloys may be the 6000/7000/8000 series of aluminum alloys, as defined by International Alloy Designation System (IADS). One preferred aluminum alloy is the 7075-T6 aluminum alloy.

Alternatively, the section 21 may be made of magnesium Mg or a magnesium alloy, where the pyrotechnic reaction is reaction (7) above Magnesium alloys may comprise for example aluminum, zinc, manganese, silicon, copper, rare earth minerals and zirconium.

It should be noted that Fe2O3 is the metal oxide in both reaction (2) and (7) above. Hence, section 21 may also comprise an alloy containing both aluminum and magnesium.

Finally, it should be noted that even though the section 21 of the housing 20 is made of the first metal, the first metal will also be present as a particulate material together with the metal oxide of the second metal as a particulate material in the compartment 30. Hence, the pyrotechnic mixture 40 comprises particulate material of the first metal and particulate material of the metal oxide of the second metal. In addition, the pyrotechnic mixture 40 may comprise additives. Such additives may be used to control (increase or decrease) temperature of the process, to control (increase or decrease) viscosity of the process, to control rheological or thermodynamic properties. Additives, such as silicates or clay minerals, may also be used to establish a more mineralogical suitability with the host rock in which the process is to be performed,

SECOND EMBODIMENT

Figure 4:
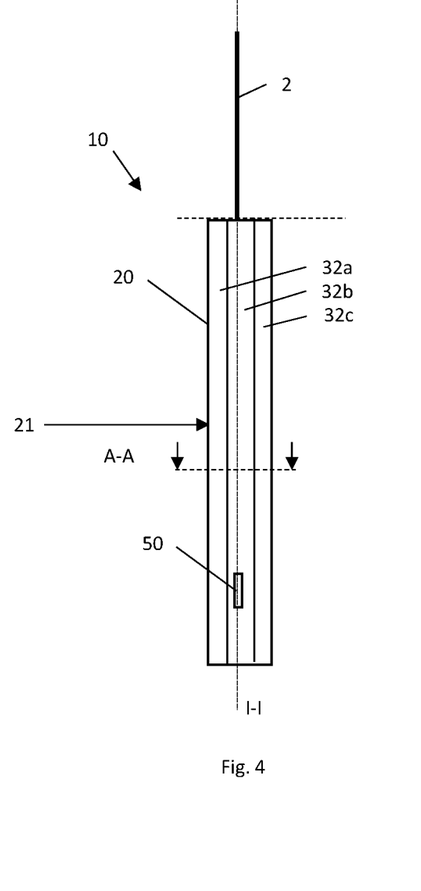
FIGS. 4 and 5 illustrate a second embodiment.
Figure 5:
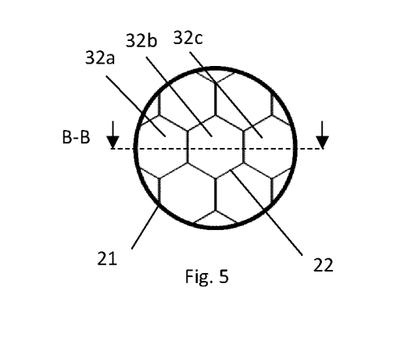

It is now referred to FIGS. 4 and 5. Here, the section 21 of the housing 20 corresponds to the entire housing 20. Hence, the entire housing 20 is made from the first metal. The pyrotechnic mixture 40 is not shown in these drawings, to improve clarity.

The section 21 here comprises an inner wall structure 22 separating the compartment 30 into a plurality of sub-compartments 32a-32n, where only compartments 32a, 32b and 32c are specifically referred to in FIGS. 4 and 5. The sub-compartments are provided in a longitudinal direction, i.e. parallel with the longitudinal center axis I-I of the well tool device 10.

In FIG. 5 it is shown that the sub-compartments have a cross sectional shape of a hexagon structure, where sub-compartment 32b is a center hexagon and where six other hexagons are provided adjacent to the center hexagon sub-compartment 32b.

The hexagon structure may contribute to an increased strength for the section 21. Different types of pyrotechnic mixtures may be used in different compartments, to control the direction and speed of the heat generation process.

It should be noted that the hexagon structure may be used with the first embodiment as well, i.e. where only the intermediate section 20b is made of the first metal. Here, the upper and/or lower housing sections 20a, 20c may be similar to the first embodiment, i.e. without hexagon structure.

THIRD EMBODIMENT

Figure 6:
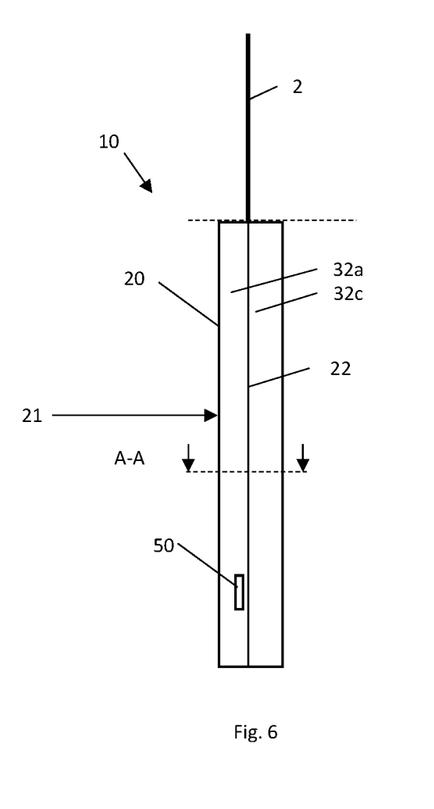
FIGS. 6 and 7 illustrate a third embodiment.
Figure 7:
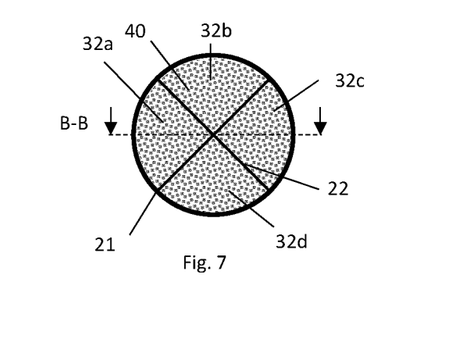

It is now referred to FIGS. 6 and 7. Here, the section 21 of the housing 20 corresponds to the entire housing 20. Hence, the entire housing 20 is made from the first metal. The pyrotechnic mixture 40 is not shown in FIG. 6, to improve clarity.

The section 21 here comprises an inner wall structure 22 separating the compartment 30 into four sub-compartments 32a-32d. The sub-compartments here has the cross sectional shape of a circular sector.

FOURTH EMBODIMENT

Figure 8:
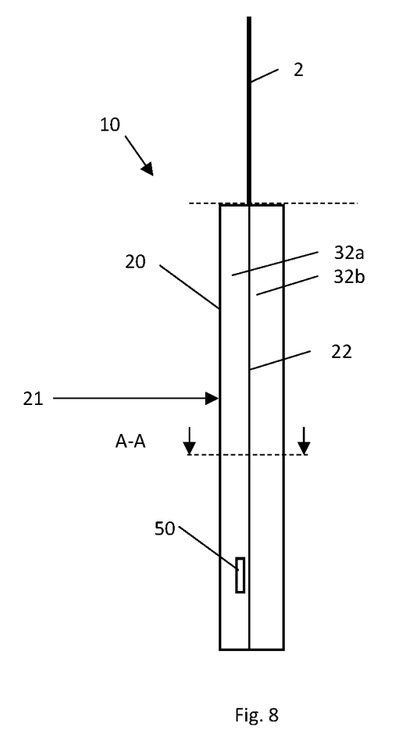
FIGS. 8 and 9 illustrate a fourth embodiment.
Figure 9:
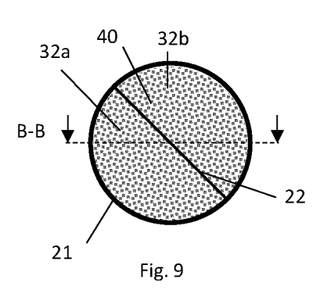

It is now referred to FIGS. 8 and 9. Here, the section 21 of the housing 20 corresponds to the entire housing 20. Hence, the entire housing 20 is made from the first metal. The pyrotechnic mixture 40 is not shown in FIG. 8, to improve clarity.

The section 21 here comprises an inner wall structure 22 separating the compartment 30 into two sub-compartments 32a-32b. The sub-compartments here has the cross sectional shape of a semi-circle.

FIFTH EMBODIMENT

Figure 10:
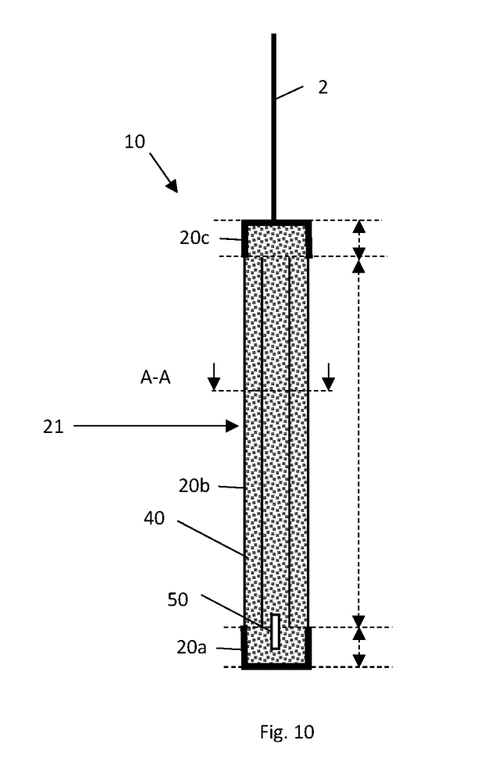
FIGS. 10 and 11 illustrate a fifth embodiment.
Figure 11:
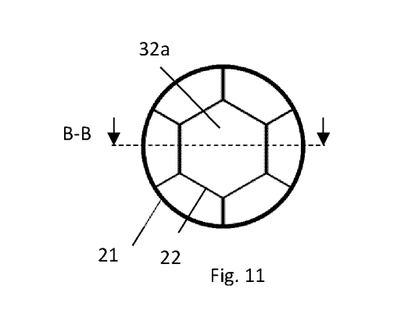

It is now referred to FIGS. 10 and 11. Here, the section 21 of the housing 20 corresponds to an intermediate housing section 20b. The pyrotechnic mixture 40 is not shown in FIG. 11, to improve clarity.

The section 21 here comprises an inner wall structure 22 separating the compartment 30 into sub-compartments. As shown in FIG. 11, there is one central compartment 32a having the cross sectional shape of a hexagon, and six sub-compartments provided radially outside of the center hexagon.

It should be noted that in this embodiment, pyrotechnic mixture 40 is provided inside of the upper and lower housing sections 20a, 20c, as well as in the sub-compartments of the section 21.

The ignition device 50 is here located partially in the section 21 and partially in the lower housing section 20a.

SIXTH EMBODIMENT

Figure 12:
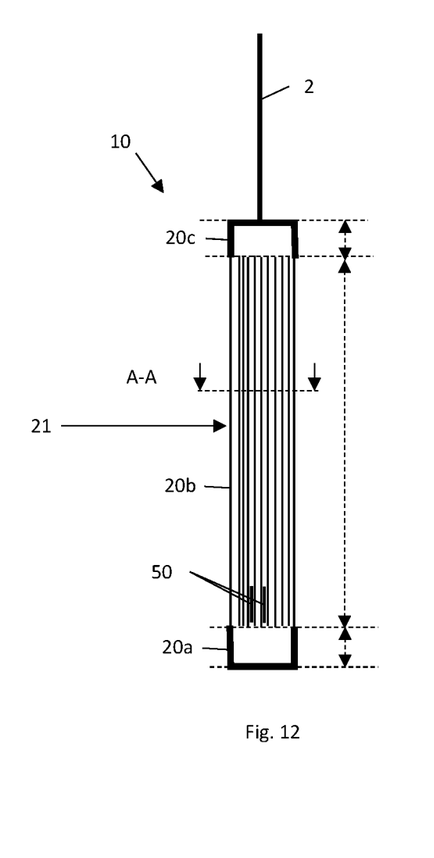
FIGS. 12 and 13 illustrate a sixth embodiment.
Figure 13:
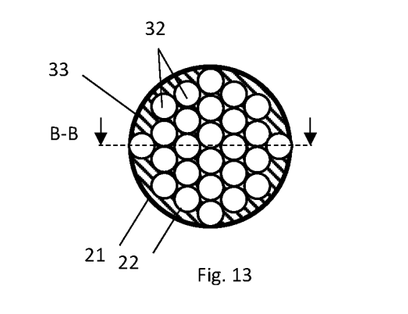

It is now referred to FIGS. 12 and 13. Here, the section 21 of the housing 20 corresponds to an intermediate housing section 20b. The pyrotechnic mixture 40 is not shown in FIG. 11 or 12, to improve clarity.

The section 21 here comprises an inner wall structure 22 separating the compartment 30 into sub-compartments. In FIG. 13, it is shown that the sub-compartments each has a cross sectional shape of a circle. In total, there are twenty-six circular compartments. Here, a space 33 is provided radially outside of the circular wall structures 22 and the inner surface of the housing section 21. This space 33 may be filled with a filler material, where the filler material can be an additive as discussed above used to affect the process itself, or an inert material to provide structural strength while not affecting the reaction.

Here, there are two ignition devices 50 shown in FIG. 13. It should be noted that there may be possible to have one ignition device 50 in each of the compartments.

SEVENTH EMBODIMENT

Figure 14:
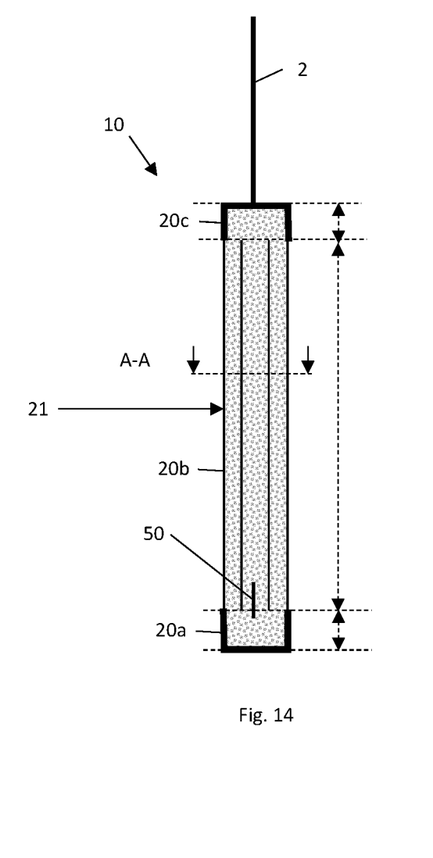
FIGS. 14 and 15 illustrate a seventh embodiment.
Figure 15:
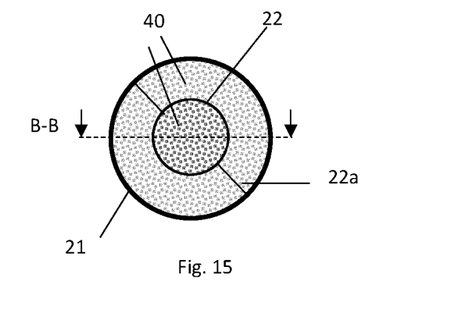

It is now referred to FIGS. 14 and 15. Here, the section 21 of the housing 20 corresponds to an intermediate housing section 20b.

Here, the wall structure 22 is provided as one cylindrical pipe provided within the cylindrical housing section 21. The wall structure 22 may be held in place by the pyrotechnic mixture 40, alternatively, the wall structure 22 may comprise radial wall structure elements 22a between the cylindrical housing section 21 and the wall structure 22.

EIGHT EMBODIMENT

Figure 16:
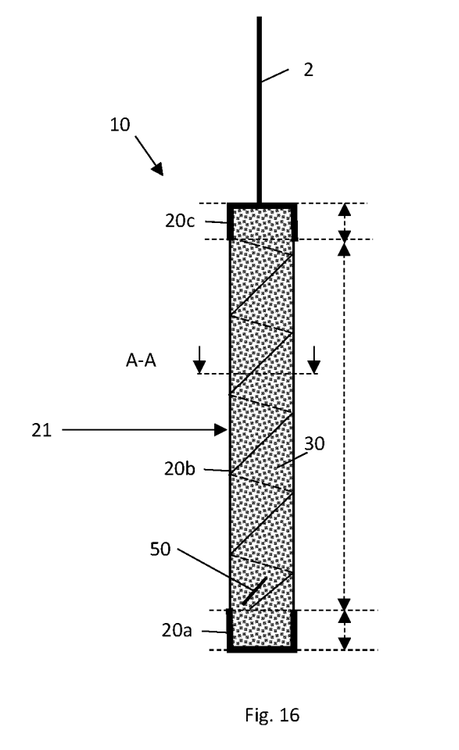
FIGS. 16 and 17 illustrate an eight embodiment.

It is now referred to FIGS. 16 and 7. Here, the section 21 of the housing 20 corresponds to an intermediate housing section 20b. The pyrotechnic mixture 40 is not shown in FIG. 7, to improve clarity.

In the above embodiments, the inner wall structure 22 is provided in a longitudinal direction, i.e. parallel with the longitudinal center axis I-I of the well tool device 10, thereby separating the compartment 30 into longitudinal sub-compartments.

One way of manufacturing such a housing section 21, in particular when aluminum or an aluminum alloy is used, is by using an extrusion process.

Figure 17:
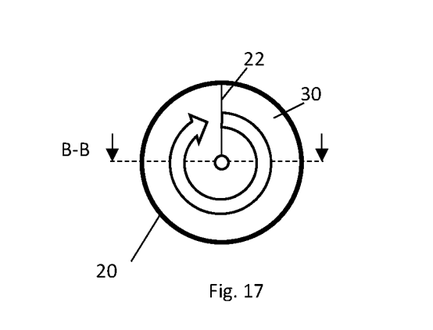

In this embodiment, an extrusion process has been used. As shown in FIG. 17, a wall element 22 is protruding into the center of the housing section 21. Here the housing section 21 has been pivoted slightly during the extrusion process, thereby forming a helical or spiral-shaped compartment 30.

It should be noted that also some of the above embodiments may be extruded while pivoting, providing several sub-compartments to be helical or spiral-shaped.

FURTHER ALTERNATIVES

In all of the above embodiments, different types of pyrotechnic mixtures may be used in different compartments, to control the direction and speed of the heat generation process.

It should further be noted that the surface of the inner wall structure 22 and the inner surface of the housing 20 may be coated. The coating may be used to control heat flux to surrounding elements and concentrate heat generated in the process to specific positions axially in tool body. Moreover, the coating may be used to decrease heat impact from specific zones in tool, i.e. metal phase which has high conductivity and heat capacity towards the host rock, resulting in lower thermal shock and stress. The coating may also be used to reduce heat loss through the tool body resulting in premature solidification of oxide phases. Examples of coating materials may be liquid carbide coatings, zirconia-based oxides, aluminum oxide etc.

The invention claimed is:

1. A well tool device for forming a permanent barrier in a well, comprising:
    a housing in which a compartment is provided;
    a pyrotechnic mixture provided within the compartment; and
    an ignition device adapted to heating at least a part of the pyrotechnic mixture to an ignition temperature of the pyrotechnic mixture;
    wherein the pyrotechnic mixture comprises a first metal and a metal oxide of a second metal;
    wherein the housing comprises a lower housing section, an upper housing section, and an intermediate housing section connecting the lower housing section and the upper housing section;
    wherein the lower housing section comprises a heat insulation material; and
    wherein the intermediate housing section of the housing is made of the first metal.

2. The well tool device according to claim 1, wherein the pyrotechnic mixture comprises a particulate of the first metal.

3. The well tool device according to claim 1, wherein the pyrotechnic mixture comprises a particulate metal oxide of the second metal.

4. The well tool device according to claim 3, wherein the second metal in an over-stoichiometric amount relative to a red-ox reaction, in which the first metal is configured to be oxidized to a metal oxide and the second metal is configured to be reduced to elementary metal.

5. The well tool device according to claim 1, wherein the first metal is more reactive than the second metal as defined in a reactivity series of metals.

6. The well tool device according to claim 1, wherein the first metal is Mg, Al, Ti, Mn, V, Zn, Cr, Mo, Co, Ni, Sn, Pb, Cu, or B.

7. The well tool device according to claim 1, wherein the metal oxide of the second metal is one of: copper(II) oxide, chromium(III) oxide, iron(II, III) oxide, manganese(IV) oxide, silicon dioxide, boron trioxide, or lead(II, IV) oxide.

8. The well tool device according to claim 1, wherein the intermediate housing section comprises an inner wall structure separating the compartment into sub-compartments.

9. The well tool device according to claim 8, wherein at least one of the sub-compartments has a cross sectional shape of a circular sector or a circular segment.

10. The well tool device according to claim 9, wherein at least one of the sub-compartments has a cross sectional shape of a circle.

11. The well tool device according to claim 8, wherein at least one of the sub-compartments has a cross sectional shape of a hexagon.

12. The well tool device according to claim 8, wherein a first type of particulate of the second metal is used in one or some of the sub-compartments, while a second type of particulate of the second metal is used in other sub-compartments.

13. The well tool device according to claim 8, wherein a first type of particulate of the first metal is used in one or some of the sub-compartments, while a second type of particulate of the second metal is used in other sub-compartments.

14. The well tool device according to claim 8, wherein a surface of the inner wall structure is coated.

15. The well tool device according to claim 8, wherein the inner wall structure is provided in a longitudinal direction, thereby separating the compartment into longitudinal sub-compartments.

16. The well tool device according to claim 1, wherein the intermediate housing section of the housing made of the first metal is shaped by means of an extruding process.

17. A well tool device for forming a permanent barrier in a well, comprising:
    a housing in which a compartment is provided;
    a heat generating mixture provided within the compartment;
    an ignition device adapted to heating at least a part of the heat generating mixture to an ignition temperature of the heat generating mixture;
    wherein the housing comprises a lower housing section, an upper housing section, and an intermediate housing section connecting the lower housing section and the upper housing section;
    wherein the lower housing section comprises a heat insulation material; and
    wherein the intermediate housing section of the housing is made from a material being a constituent of the heat generating mixture.

18. A method comprising:
    forming a permanent barrier in a well using a well tool device,
    wherein the well tool device comprises:
        a housing in which a compartment is provided;
        a heat generating mixture provided within the compartment;
        an ignition device adapted to heating at least a part of the heat generating mixture to an ignition temperature of the heat generating mixture;
        wherein the housing comprises a lower housing section, an upper housing section, and an intermediate housing section connecting the lower housing section and the upper housing section;
        wherein the intermediate housing section of the housing is made from a material being a constituent of the heat generating mixture;
        wherein the lower housing section comprises a heat insulation material; and
        wherein the intermediate housing section of the housing is consumed during a heat generating process started by heating at least a part of the heat generating mixture to the ignition temperature of the heat generating mixture.

* * * * *